T. W. JOHNSON.
TEA STRAINER.
APPLICATION FILED JULY 27, 1912.
1,053,823.
Patented Feb. 18, 1913.
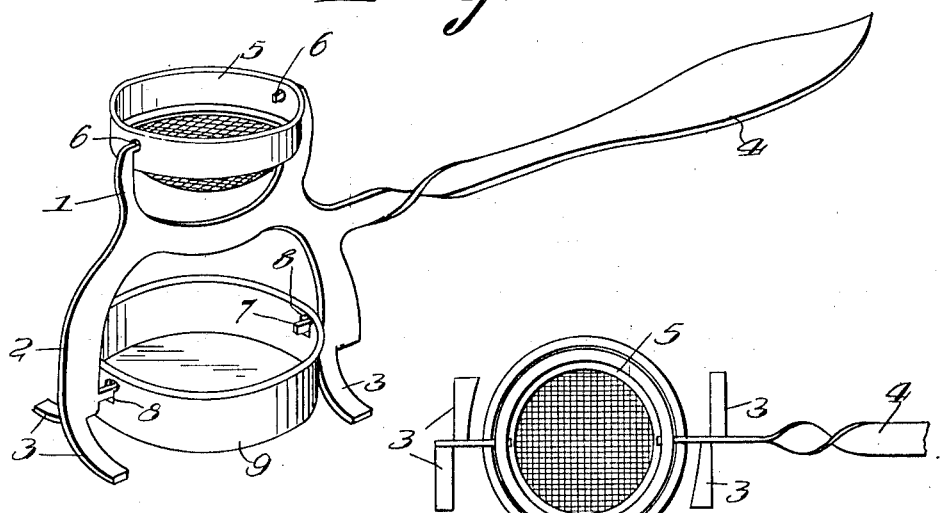
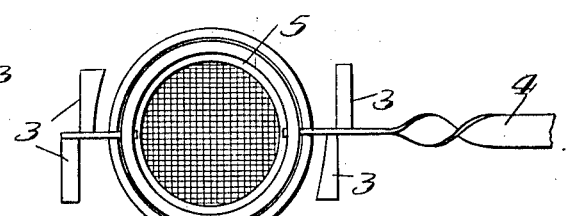
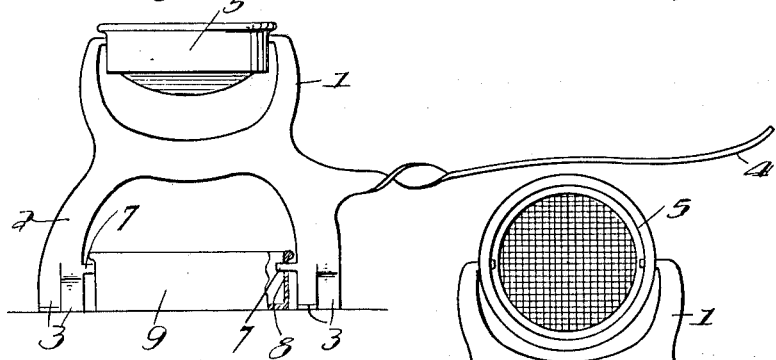
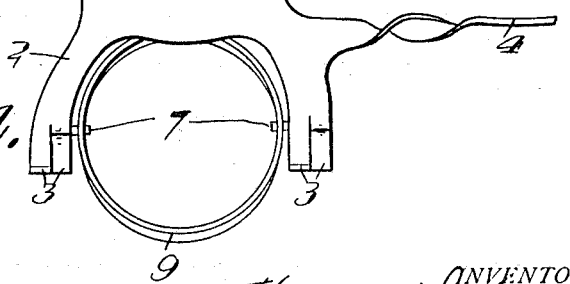
WITNESSES
Ada E Hagerty
Walter A French
INVENTOR
Thomas W. Johnson
Joseph H Miller
Attorney

UNITED STATES PATENT OFFICE.

THOMAS W. JOHNSON, OF NORTH ATTLEBORO, MASSACHUSETTS, ASSIGNOR OF ONE-HALF TO ANDREW J. NEUSCHUEZ, OF NORTH ATTLEBORO, MASSACHUSETTS.

TEA-STRAINER.

1,053,823.  Specification of Letters Patent.  Patented Feb. 18, 1913.

Application filed July 27, 1912. Serial No. 711,848.

*To all whom it may concern:*

Be it known that I, THOMAS W. JOHNSON, a citizen of the United States, residing at North Attleboro, in the county of Bristol and State of Massachusetts, have invented a new and useful Improvement in Tea-Strainers, of which the following is a specification.

This invention relates to certain new and useful improvements in tea strainers, and the primary object of the invention is to provide a strainer that has an automatic drip cup attachment, whereby when the strainer occupies its normal position, in which it may be placed on a support or the like, the cup is in position to receive the drippings from the strainer, and when the device is given a partial turn the drip cup will be moved away from the strainer so as not to interfere with the use thereof, the cup being automatically restored to position to receive the strainer drippings, when the device is turned back to normal position.

In the drawings—Figure 1 is a perspective view of the invention showing the position the parts occupy when in normal position. Fig. 2 is a side elevation. Fig. 3 is a top plan view of Fig. 1, and Fig. 4 is a top plan view showing the device in position for straining.

In proceeding in accordance with the present invention, a frame or stand is employed which consists of oppositely disposed forked-shaped upper and lower parts 1 and 2 respectively, the forked lower part providing legs, which are bifurcated at their lower ends, the furcations being bent in opposite directions to form feet 3, which act to support the structure. A handle 4 is connected to the frame between its ends to allow of manual holding and manipulation of the device, so that same may not only be transported, but also operated to assume its straining position. A strainer proper 5 is provided in the forked upper part 1 and extending into openings provided therefor in the side wall of the strainer. The legs of the frame also have pintles 7 which are located above the feet 3 and extend into key-hole shaped openings 8 that are formed in the side of the drip cup 9. The purpose of having key-hole shaped openings is that when the device is raised up from the support, the drip cup, will, by virtue of the action of gravity, drop to cause the round upper portions of the openings 8 to receive the pintles 7 thereby allowing the cup to have pivotal movement, and when the device is placed on a support, such as a table, the drip cup 9 will be moved upwardly to cause the pintles 8 to enter the contracted rectangular lower portions of the openings 8, and since the pintles 7 are of rectangular cross-section they will conformably engage in said lower portions of openings 8 and assist in holding the drip cup firmly seated.

In use when the parts occupy the position depicted in Fig. 1 of the drawings, the cup 9 occupies a position where it catches all of the drippings from the strainer, and when the device is raised by means of the handle and the latter is moved through an arc of 90° to the position shown in Fig. 4 of the drawings, the cup and strainer will automatically move about their pivots to the positions shown in said figure in which, it will be noted, that the cup is disposed to one side of the strainer, permitting free and unrestricted use of the latter.

Having thus described my invention, I claim as new and desire to secure by Letters Patent;—

1. In a tea strainer, a frame consisting of oppositely disposed upper and lower forked-shaped parts, a handle at right angles to the frame connected thereto, a strainer proper pivoted in the upper forks of the frame, the lower forks providing legs for the frame, which legs are bifurcated and the furcations turned outwardly in opposite directions to form supporting feet for the frame, and a drip cup pivoted between the legs and having key-hole shaped slots to receive the pivots.

2. In a tea strainer, a vertical stand, a strainer proper pivoted to the top of the stand and a drip cup for said strainer proper pivoted to the lower end of the stand and underlying said strainer proper when the stand is in vertical position, said cup, when the stand is given a part turn, occupying a position to one side of the strainer proper.

3. A tea strainer including a supporting frame, a strainer proper pivoted to said frame and a drip cup pivoted to said frame so that in one position of the frame the drip cup underlies the strainer and in another position the drip cup is disposed to one side of the strainer.

4. A tea strainer including a frame, a strainer proper and a drip cup pivoted to said frame at opposite ends thereof, and a handle connected to the frame and disposed between the strainer and cup.

5. A tea strainer including a frame having supporting feet at one end, a drip cup pivoted to the frame above the feet, and a strainer proper pivoted to the upper end of the frame.

6. A tea strainer including a frame having a pivoted strainer proper and a pivoted and vertically movable drip cup.

In testimony whereof I have signed my name to this specification in the presence of two subscribing witnesses.

THOMAS W. JOHNSON.

Witnesses:
ADA E. HAGERTY,
J. A. MILLER.